No. 848,926. PATENTED APR. 2, 1907.
C. SCHIEBELER.
SYSTEM OF MOTOR CONTROL.
APPLICATION FILED SEPT. 5, 1905.
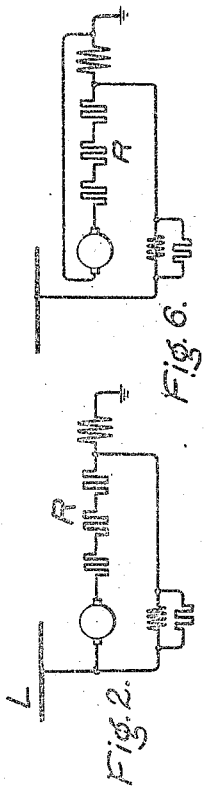
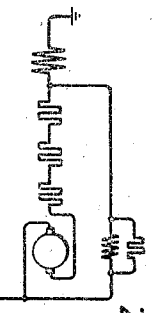
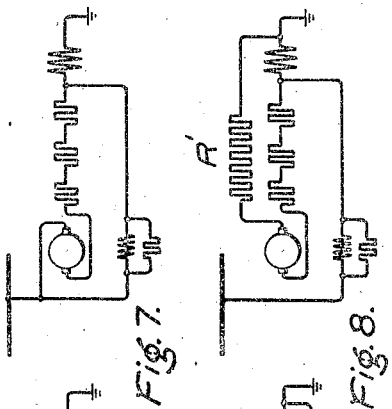
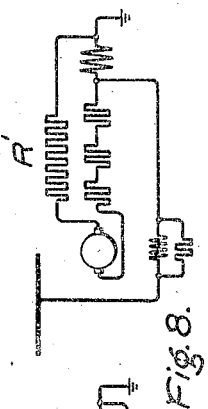
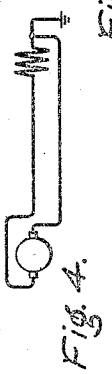
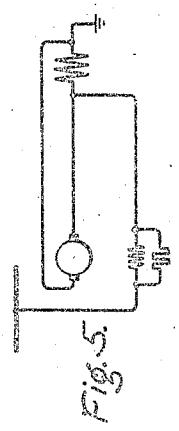
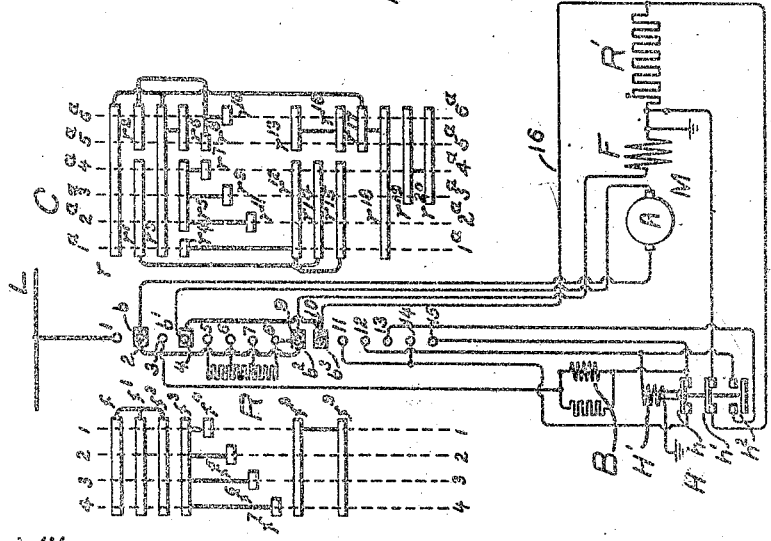
Witnesses:
Inventor:
Carl Schiebeler.
By Atty.

UNITED STATES PATENT OFFICE.

CARL SCHIEBELER, OF BERLIN, GERMANY, ASSIGNOR TO GENERAL ELECTRIC COMPANY, A CORPORATION OF NEW YORK.

SYSTEM OF MOTOR CONTROL.

No. 848,926.    Specification of Letters Patent.    Patented April 2, 1907.

Application filed September 5, 1905. Serial No. 276,928.

*To all whom it may concern:*

Be it known that I, CARL SCHIEBELER, a subject of the King of Prussia, residing at Berlin, Germany, have invented certain new and useful Improvements in Systems of Motor Control, of which the following is a specification.

The present invention relates to control apparatus for electric motors, and more particularly for motors which are operated at times as braking-generators. In electric hoisting systems, for example, the motor is connected for operation as a braking-generator in lowering heavy loads and operates only as a motor when the load to be lowered is too light to descend of its own accord. The controller in such systems is provided with braking and power positions succeeding each other, the braking positions usually preceding the power positions. It may be that the operator when lowering a heavy load carelessly moves the controller to the lowering power position, whereupon the motor attains a speed much greater than normal. If after this high speed has been reached the controller is returned to the braking position, an undue strain is imposed upon the motor, and there is danger of burning out the armature. The motor may be protected against accidents of this character by normally interposing in the brake-circuit a resistance sufficiently large to keep the current in this circuit at all times within safe limits; but in such cases a weak braking connection results under normal conditions, and it is impossible to bring the load to rest through the electric braking action.

The object of the present invention is to provide means in a system of the character specified whereby the motor may operate effectually as a braking-generator to bring a load to rest under normal conditions and at the same time be protected against damage in case the controller is moved into the power positions and back again into the braking positions when the load is heavy.

To the above ends I have associated with the motor a comparatively high auxiliary resistance which is normally short-circuited or cut out of the braking-circuit when the controller is moved from its "off" position into the braking positions, but which is inserted in the braking-circuit whenever the controller is moved into the lowering power positions and is retained in the braking-circuit until the controller is again returned to its off position. By this arrangement the motor may produce a powerful braking effect when operated in the proper manner, but will be protected against too heavy currents when the controller is improperly handled.

The present invention will be more fully understood from the following description, taken in connection with the accompanying drawings illustrating one form of the invention.

In said drawings, Figure 1 shows diagrammatically a hoisting-motor and controller connected and arranged in accordance with the present invention. Figs. 2-8, inclusive, show the motor connections in several different positions of the controller.

Reference being had to Fig. 1, M represents a series motor, comprising the armature A and the field F. R is a resistance arranged to be introduced into the motor-circuit and removed therefrom section by section to increase the motor speed. C is a controller which, as shown, has four forward or hoisting running positions, four reverse or lowering braking positions, and two lowering power positions. B is a brake-solenoid. These various elements may, except as hereinafter specified, take any usual or desired forms. The controller comprises a row of fixed contacts 1 to 15 and movable contacts $f-f^9$, $b-b^3$, $r-r^{20}$. In the normal or off position of the controller the movable contacts $b$ $b'$ $b^2$ $b^3$ engage, respectively, with fixed contacts 2, 4, 9, and 10, giving the motor connections shown in Fig. 4—namely, the motor is short-circuited upon itself. When the controller is moved toward the right, the contacts $f-f^9$ are brought into engagement with the fixed contacts along line $l$ $l$, and the following circuits may be traced: from line L, through fixed contact 1, contacts $f, f'$, and 2 through the motor-armature, contacts 4, $f^3$, $f^4$, and 5, through the resistance R, field of the motor, to ground. A branch circuit passes from contact $f'$, through contacts $f^2$ and 3, through solenoid B, contacts 11 $f^5$ $f^6$, to contact 9, the solenoid B being therefore connected in parallelism with the motor-armature and the resistance R. The motor is now connected between line and ground with all resistance in circuit, as shown in Fig. 2, and the mechanical brake is lifted by reason of the energization of the brake-solenoid. In the following positions of the controller the resistance R is cut out section by section until the motor is connected between line and ground with no extraneous resistance in circuit therewith, as indicated in Fig. 3. Upon bringing the controller back to the position shown the circuit conditions indicated in Fig. 4 are produced and the motor acts as a brake to the ascending load.

Upon moving the controller to the left the movable contacts $r$–$r^{20}$ are brought into engagement with fixed contacts along line $l^a$ $l^a$. The following circuits may now be traced: from line L, through contacts 1, $r$, $r^3$, and 3, through solenoid B, through contacts 11, $r^{15}$, $r^{12}$, and 9, through the field F of the motor, to ground. The field of the motor is thus excited and the mechanical brake lifted. Beginning with the left-hand terminal of field F, a circuit may be traced through the armature as follows: through contacts 9, $r^{12}$ $r^4$, and 4, through the motor-armature, thence to contact 2, contact $r'$, contact $r^{14}$, contact 10, through wire 16 to the right-hand terminal of field F. The armature and field of the motor are now connected in a closed circuit, with the field excited by current flowing through the brake-solenoid. This condition is illustrated in Fig. 5. It will be seen that the motor at this time produces its greatest braking effort, since there is no extraneous resistance in its circuit. As the movement of the controller is continued the sections of resistance R are cut into the armature-circuit through contacts $r^{11}$, $r^9$, and $r^7$, respectively, until in the position corresponding to line $4^a$ $4^a$ all of the resistance is included in the armature-circuit, as shown in Fig. 6. In the next succeeding position of the controller—namely, when the movable contacts along line $5^a$ $5^a$ are in engagement with the fixed contacts—the motor is connected directly across the line with all resistance in circuit, as shown in Fig. 7, the operation of the motor being now to drive the load downward. In this latter position of the controller an additional result is produced.

It will be noted in Fig. 1 that a portion of wire 16 forms a shunt about a resistance R', this resistance being the auxiliary braking resistance. In this shunt are situated the contacts $h'$ of a relay H, and it is evident that when these contacts are opened the shunt about the resistance R' is broken and the armature-circuit, as shown in Figs. 5 and 6, will be made to include the resistance R'. In the first lowering power position a circuit may be traced from line L to contacts $l$, $r$, $r^{17}$, and 12, through the actuating-coil H' of the relay H, to ground. The core of the relay is now lifted and contacts $h'$ are opened. In operating the relay establishes for itself a maintaining-circuit from line L to contact $r^{17}$, as before, to contact $r^{18}$, contact 13, auxiliary contacts $h^2$, associated with the relay and closed when the relay is operated, and thence through the coil H' of the relay to ground. It is seen, therefore, that once the relay has been operated it will remain in its operated position until the contact $r^{18}$ leaves contact 13—namely, until the controller is moved to its off position. When, therefore, the controller is returned from the lowering power positions to the lowering brake positions, the resistance R' is included in the armature-circuit of the motor, as indicated in Fig. 8. Since the resistance R' serves primarily as an emergency protective device, it should have such a value that the current in the generator-circuit will be kept within safe limits although the speed of the motor may have been brought to several times the normal speed by reason of the controller having been moved to the lowering power positions while a heavy load is being lowered.

Since the resistance R' may be much greater than the entire resistance R, it will often be unnecessary to require the controller to be returned to its off position before the circuit of the solenoid is interrupted and the mechanical braking applied, for the reason that the electrical braking action will not be increased materially as the controller approaches the off position. I have therefore provided means for applying the mechanical brake before the controller reaches the off position in case it first has been removed to a lowering power position. To this end the relay H is provided with an additional set of contacts $h$, arranged in the circuit of the solenoid B. Consequently when the controller is turned to position $5^a$ the circuit of the solenoid will be interrupted at the relay and will remain interrupted until the controller again reaches the off position. In order, however, that the operation of the relay shall not immediately apply the mechanical brake-contacts $r^{19}$ $r^{20}$ are provided, these contacts having such lengths that in the last two braking positions and in the lowering-power positions of the controller they coöperate with fixed contacts 14 and 15, which are connected in shunt to the contact $h$. Thus a shunt is formed about the relay-contacts before the relay is operated, and the brake-solenoid is not deënergized until the controller has left position $3^a$ in its backward movement.

Although I have described in detail a preferred form of the present invention, I do not desire to be limited to the particular form shown, since in its broader aspect the present invention may be embodied in various forms.

What I claim as new, and desire to secure by Letters Patent of the United States, is—

1. In a system of control, a motor, a motor-controller having "off," braking and power positions, and means associated with said controller for effecting different braking conditions in the same position of the controller according as the controller is moved to the braking position from the "off" position or from the power position.

2. In a system of control, a motor, a motor-controller arranged to connect the motor to a source of power to drive it when in a power position and to connect said motor as a braking-generator when in a braking position, and means for producing an ultimate change in the condition of the braking-circuit in the same position of the controller upon operating the controller from the braking position to the power position and back to the braking position.

3. In a system of control, a motor, a motor-controller having power, braking and "off" positions and contacts arranged to respectively connect the motor to a source of current-supply to drive the same, to connect the motor as a braking-generator, and to disconnect the motor from the source of current-supply, in said several positions, and means for effecting different conditions in the circuit of the braking-generator in the same position of the controller according as the controller is moved to the braking position from the power position or from the "off" position.

4. In a system of control, a motor, a source of current-supply, a controller arranged to connect said motor as a braking-generator in its braking position and for operation as a motor in its power position, a motor-protecting device normally inoperative when said motor operates as a braking-generator, and means for rendering said protecting device operative upon moving the controller from said power position to the said braking position.

5. In a system of control, a motor, a source of current-supply, a controller arranged to connect said motor as a braking-generator in its braking position and for operation as a motor in its power position, a normally inoperative resistance, and means for introducing said resistance into the braking-circuit upon moving the controller from said power position to said braking position and for preventing the introduction of said resistance into the braking-circuit upon moving the controller from off position to said braking position.

6. In a system of control, a motor, a source of current-supply, a motor-protecting device, a controller having "off", braking and power positions and contacts arranged to connect said motor to said source of current-supply for operation as a motor in said power position and to connect said motor as a braking-generator independently of said protecting device when the controller is moved to the braking position from the "off" position, and means for bringing said protecting device into play upon moving the controller from the power position to the braking position.

7. In a system of control, a motor, a source of current-supply, a motor-controller having braking and power positions, contacts in said controller arranged to connect said motor as a braking-generator in the braking position, an auxiliary braking resistance in the generator-circuit, means for normally short-circuiting said resistance, and means associated with said controller for opening said short circuit upon moving the controller to the braking position through the power position.

8. In a system of control, a motor, a source of current-supply, a motor-controller having "off," braking and power positions, contacts on said controller arranged to connect said motor for operation as a braking-generator in said braking position and for operation as a motor in said power position, an auxiliary braking resistance, a relay for normally short-circuiting said resistance, contacts in the power positions of said controller for completing an actuating-circuit for said relay, and means for maintaining said relay in its actuated position until the controller is returned to its "off" position.

9. In a hoisting system, a motor, a reversing-controller for said motor, said controller having an "off" position between its "up" and "down" sides and braking and power positions on its "down" side, and means associated with said controller for effecting different braking conditions according as the controller is moved to the braking position or positions from the "off" position or from the "down" power position or positions.

10. In a hoisting system, a motor, a source of current-supply, a reversing-controller for said motor, said controller having on its "down" side braking and power positions, and contacts arranged to connect said motor as a braking-generator in said braking position or positions and for operation as a motor in said power position or positions, a motor-protective device normally inoperative when said motor operates as a braking-generator, and means for rendering said protective device operative upon moving the controller from said power position or positions to the said braking position or positions.

11. In a hoisting system, a motor, a source of current-supply, a reversing-controller having between its "up" and "down" sides an "off" position and braking and power positions on its "down" side, contacts on said controller arranged to connect said motor for operation as a braking-generator in said braking position or positions and for operation as a motor in said power position or positions, an auxiliary braking resistance, and a relay for normally short-circuiting said resistance, contacts in the said power position or positions of the controller for completing an actuating-circuit for said relay, and means for maintaining said relay in its actuated position until the controller is returned to its "off" position.

In witness whereof I have hereunto set my hand this 14th day of August, 1905.

CARL SCHIEBELER.

Witnesses:
 JULIUS RUMLAND,
 COPAR SINGER.